(12) United States Patent
Togashi (10) Patent No.: US 11,586,749 B2
(45) Date of Patent: Feb. 21, 2023

(54) PROCESSING APPARATUS, SYSTEM, PROCESSING METHOD, AND COMPUTER PROGRAM (71) Applicant: NEC CORPORATION, Tokyo (JP)

(72) Inventor: Yuji Togashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 17/041,762

(22) PCT Filed: Mar. 27, 2019

(86) PCT No.: PCT/JP2019/013308
§ 371 (c)(1),
(2) Date: Sep. 25, 2020

(87) PCT Pub. No.: WO2019/189433
PCT Pub. Date: Oct. 3, 2019

(65) Prior Publication Data
US 2021/0124833 A1 Apr. 29, 2021

(30) Foreign Application Priority Data
Mar. 28, 2018 (JP) .............. JP2018-061008

(51) Int. Cl.
G06F 21/62 (2013.01)
G06F 21/60 (2013.01)
G06K 9/62 (2022.01)

(52) U.S. Cl.
CPC ........ *G06F 21/6209* (2013.01); *G06F 21/602* (2013.01); *G06F 21/604* (2013.01); *G06K 9/6231* (2013.01)

(58) Field of Classification Search
CPC .. G06F 21/6209; G06F 21/602; G06F 21/604; G06F 21/6231
See application file for complete search history.

(56) References Cited

U.S. PATENT DOCUMENTS

| 5,845,041 A | * | 12/1998 | Ohkuma | .............. | H04N 21/236 |
| | | | | | 386/346 |
| 2005/0111397 A1 | * | 5/2005 | Attar | .................. | H04W 74/002 |
| | | | | | 370/319 |

(Continued)

FOREIGN PATENT DOCUMENTS

| JP | 2002-190798 A | 7/2002 |
| JP | 2002-199453 A | 7/2002 |

(Continued)

OTHER PUBLICATIONS

International Search Report for PCT/JP2019/013308 dated May 21, 2019 (PCT/ISA/210).

(Continued)

*Primary Examiner* — Vance M Little
(74) *Attorney, Agent, or Firm* — Sughrue Mion, PLLC (57) ABSTRACT A processing apparatus (10) includes a dividing means (110). The dividing means (110) divides data into a plurality of pieces of partial data by degree of importance, based on a content of the data. Then, first partial data and second partial data having a degree of importance higher than that of the first partial data are held separately from each other. The data are, for example, sensor data or camera data constituted of a plurality of values. For example, the second partial data are encrypted.

11 Claims, 9 Drawing Sheets (56) References Cited

U.S. PATENT DOCUMENTS

| | | | | |
|---|---|---|---|---|
| 2007/0027880 A1* | 2/2007 | Dettinger | ............ | G06F 21/6227 |
| 2007/0101436 A1* | 5/2007 | Redlich | ............... | G06F 21/6209 |
| | | | | 726/27 |

FOREIGN PATENT DOCUMENTS

| | | |
|---|---|---|
| JP | 2002-271208 A | 9/2002 |
| JP | 2002-366437 A | 12/2002 |
| JP | 2007-036448 A | 2/2007 |
| JP | 2007-233796 A | 9/2007 |

OTHER PUBLICATIONS

Japanese Office Action for JP Application No. 2020-509230 dated Dec. 27, 2022 with English transiation.

\* cited by examiner

PROCESSING APPARATUS, SYSTEM, PROCESSING METHOD, AND COMPUTER PROGRAM

CROSS REFERENCE TO RELATED APPLICATIONS

This application is a National Stage of International Application No. PCT/JP2019/013308 filed Mar. 27, 2019, claiming priority based on Japanese Patent Application No. 2018-061008 filed Mar. 28, 2018, the disclosure of which is incorporated herein in its entirety by reference.

TECHNICAL FIELD

The present invention relates to a processing apparatus, a system, a processing method, and a computer program.

BACKGROUND ART

In an IoT service and the like, an enormous amount of data may be collected and handled. Data may include important information, and therefore confidentiality is required. On the other hand, applying security at a high level, such as encryption and site distribution of data storage, to all pieces of data causes an increase in an operation cost particularly when a data amount is enormous.

An encryption processing device in PTL 1 determines whether encryption is necessary for data, based on an aspect of data, an item included within data, or the like. The item included within the data is, for example, an indicator related to a degree of importance of the data.

An encryption device in PTL 2 sets an encryption parameter in such a way that an encryption level is set to a level according to a degree of importance of target data.

CITATION LIST

Patent Literature

[PTL 1] Japanese Patent Application Publication No. 2002-366437

[PTL 2] Japanese Patent Application Publication No. 2007-36448

SUMMARY OF INVENTION

Technical Problem

In the techniques in PTLs 1 and 2, there is a problem that a human cost is required since a degree of importance of data cannot be determined without an input from a user. In the encryption processing device in PTL 1, a user needs to input a condition related to encryption for each piece of data. Further, in the encryption processing device in PTL 2, a user needs to set a degree of importance of data to be processed.

The present invention has been made in view of the above-described problem. An object of the present invention is to provide a technique capable of protecting data while suppressing a cost.

Solution to Problem

A processing apparatus according to the present invention, including
a dividing unit that divides data into a plurality of pieces of partial data by degree of importance based on a content of the data,
wherein first partial data and second partial data are held separately from each other, the second partial data having the degree of importance higher than that of the first partial data.

A system according to the present invention, including
a device and a processing apparatus,
wherein the device includes:
a generation unit that generates data; and
a transmission unit that transmits the data, and
the processing apparatus includes:
a reception unit that receives the data;
a dividing unit that divides the data into first partial data and second partial data based on a content of the data, the second partial data having a degree of importance higher than that of the first partial data; and
a storage unit that holds at least one of the first partial data and the second partial data.

A processing method according to the present invention, including
dividing data into a plurality of pieces of partial data by degree of importance based on a content of the data,
wherein first partial data and second partial data are held separately from each other, the second partial data having the degree of importance higher than that of the first partial data.

A computer program according to the present invention is a computer program for achieving a processing apparatus, causing a computer to function as
a dividing unit that divides data into a plurality of pieces of partial data by degree of importance based on a content of the data,
wherein first partial data and second partial data are held separately from each other, the second partial data having the degree of importance higher than that of the first partial data.

Advantageous Effects of Invention

According to the present invention, it is possible to provide a technique capable of protecting data while suppressing a cost.

BRIEF DESCRIPTION OF DRAWINGS

The above-described object, the other objects, features, and advantages will become more apparent from suitable example embodiments described below and the following accompanying drawings.

EXAMPLE EMBODIMENT

Hereinafter, example embodiments of the present invention will be described with reference to drawings. Note that, in all of the drawings, the same components have the same reference signs, and description thereof will not be repeated as appropriate. Further, in each block diagram, each block represents a configuration of a functional unit instead of a configuration of a hardware unit unless otherwise described.

First Example Embodiment

Figure 1:
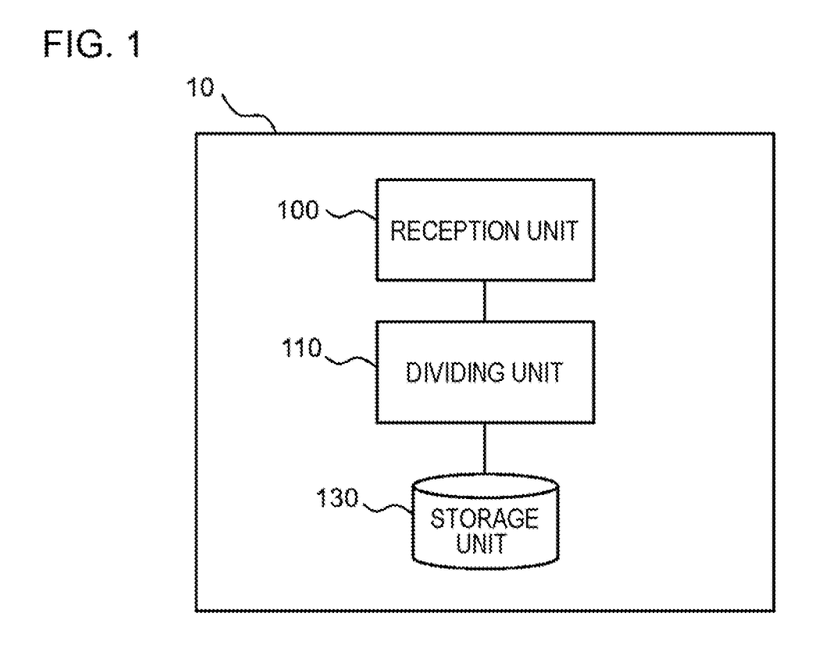
FIG. 1 is a block diagram illustrating a functional configuration of a processing apparatus according to a first example embodiment.

FIG. 1 is a block diagram illustrating a functional configuration of a processing apparatus 10 according to a first example embodiment. The processing apparatus 10 includes a dividing unit 110. The dividing unit 110 divides data into a plurality of pieces of partial data by degree of importance, based on a content of the data. Then, first partial data and second partial data are held separately from each other. The second partial data has a degree of importance higher than that of the first partial data. Details will be described below.

Holding the first partial data and the second partial data separately from each other refers to, for example, holding them by holding methods having security levels different from each other. The processing apparatus 10 according to the present example embodiment, divides data into a plurality of pieces of partial data, based on a degree of importance. Then, each of the pieces of partial data is held at a degree of security according to the degree of importance. Herein, a processing cost for acquiring the held partial data is higher as a security level is higher. Therefore, the processing apparatus 10 according to the present example embodiment can suppress an operation cost further than that when all pieces of data are held at a high security level.

Further, according to the present example embodiment, data are divided into pieces of partial data, based on a content of the data itself. Therefore, a human cost for data protection can be suppressed since intervention of a determination by a user for each piece of data is not necessary.

The processing apparatus 10 according to the present example embodiment further includes a reception unit 100 that receives data. The reception unit 100 receives and acquires the data from an outside in a wired or wireless manner. The dividing unit 110 divides the data received by the reception unit 100. Further, the processing apparatus 10 according to the present example embodiment further includes a storage unit 130. The storage unit 130 holds at least one of the first partial data and the second partial data. The processing apparatus 10 can protect the data received by the reception unit 100 with appropriate security while suppressing a cost.

In the present example embodiment, data are constituted of a plurality of values. The data are, for example, sensor data or camera data. The sensor data include a plurality of measurement values by a sensor. Information indicating a time of measurement may be associated with each of the measurement values. Further, the camera data are two-dimensional data captured by a camera, and include XY coordinates and a value in each coordinate. Note that the camera data may be a gray image or a color image. Information indicating coordinates may be associated with each numeric value. Hereinafter, a value included in the data is, for example, a measurement value of the sensor data or a value in each coordinate of the camera data.

Note that, when a data amount of data received by the reception unit 100 at once is less than a predetermined data amount, the reception unit 100 may accumulate data over reception for a plurality of times. When a total of the data amount of the data accumulated in the reception unit 100 is greater than or equal to the predetermined data amount, the dividing unit 110 performs dividing processing.

As described above, the dividing unit 110 divides data into a plurality of pieces of partial data by degree of importance, based on a content of the data. In the present example embodiment, the content of the data is a value included in the data. Further, the plurality of pieces of partial data each include one or more values.

The dividing unit 110 according to the present example embodiment divides data in such a way that a value whose deviation with the data as a population is greater than or equal to a threshold value among values included in the data is set to be a value included in the second partial data. For example, in sensor data, there is a variation in importance having an individual value included in the data. Specifically, it is considered that importance of a value associated with a singular point that has a great effect on a statistic is higher than that of a value at a normal time. For example, an application that detects such a singular point and takes some sort of action is conceivable. By dividing data in such a way that a value whose deviation with the data as a population is greater than or equal to a threshold value among values included in the data is set to be a value included in the second partial data, a value having a great effect on a statistic, such as an average and a variance, is extracted and acquired as the second partial data.

The dividing unit 110 divides data, and generates a plurality of pieces of partial data. The plurality of pieces of partial data include the first partial data and the second partial data. A degree of importance of the second partial data is higher than a degree of importance of the first partial data. A method of dividing data by the dividing unit 110 will be described below in detail.

A threshold value used for division can be predetermined according to, for example, an amount of the second partial data and a degree of a security level at which the second partial data are held. For example, as a threshold value is set higher, the data amount of the second partial data is smaller, and a degree of importance of the second partial data is higher. Therefore, when the second partial data having a smaller data amount are held at a high security level, the threshold value may be set higher. A balance between an operation cost and an entire security level can be flexibly set by adjusting the threshold value. The threshold value does not need to be set for each piece of data and each division.

As described above, the generated first partial data and second partial data are held separately from each other. Then, the second partial data are held at a security level higher than that of the first partial data. Herein, holding pieces of data separately refers to holding data as separate pieces of data, and is, for example, at least either holding pieces of data in different encrypted states or holding pieces of data by physically different storage units. Further, a security level is high means that, for example, a great amount of information about an encryption key is needed to decrypt encrypted partial data, a great number of processing stages is required until partial data are acquired, a degree of difficulty in accessing to a storage unit that holds partial data is high, and the like.

More specifically, a first example of a method of holding the first partial data and the second partial data will be described below. In the present example, at least the second partial data are encrypted. On the other hand, the first partial data are not encrypted or are encrypted in such a way that decryption is easier than the second partial data.

Figure 2:
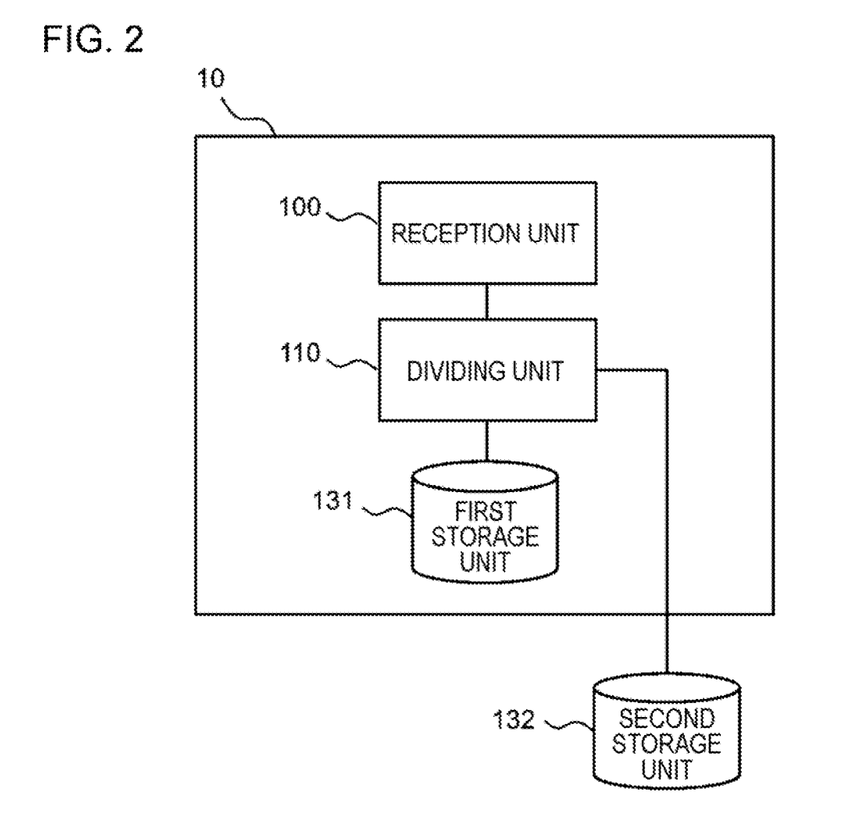
FIG. 2 is a block diagram illustrating a functional configuration of the processing apparatus in a second example of a method of holding first partial data and second partial data.

FIG. 2 is a block diagram illustrating a functional configuration of the processing apparatus 10 in a second example of the method of holding the first partial data and the second partial data. In the present example, a first storage unit 131 for holding the first partial data and a second storage unit 132 for holding the second partial data are disposed away from each other.

In the example in FIG. 2, the first storage unit 131 is included in the processing apparatus 10, and the second storage unit 132 is provided outside the processing apparatus 10. However, both of the first storage unit and the second storage unit may be included in the processing apparatus 10, and both of them may be provided outside the processing apparatus 10. The first storage unit 131 and the second storage unit 132 are physically different storage devices. The second storage unit 132 holds information at a security level higher than the first storage unit 131. For example, the second storage unit 132 requires authentication to read information. Note that the plurality of second storage unit 132 may be prepared, the second partial data may be further divided into a plurality of pieces of partial data and held the divided data, and the second partial data may be moved periodically.

A risk of theft of data by a physical means and a risk of data loss due to a failure of facility can be reduced by distributing a plurality of pieces of partial data or moving some pieces of partial data. Further, although an increase in an operation cost due to an increase in a storage site of data in order to distribute and dispose storage unit, and a decrease in processing speed when data are read may become problems, an effect of the problems can be reduced by distributing and disposing only partial data having a high degree of importance.

Figure 3:
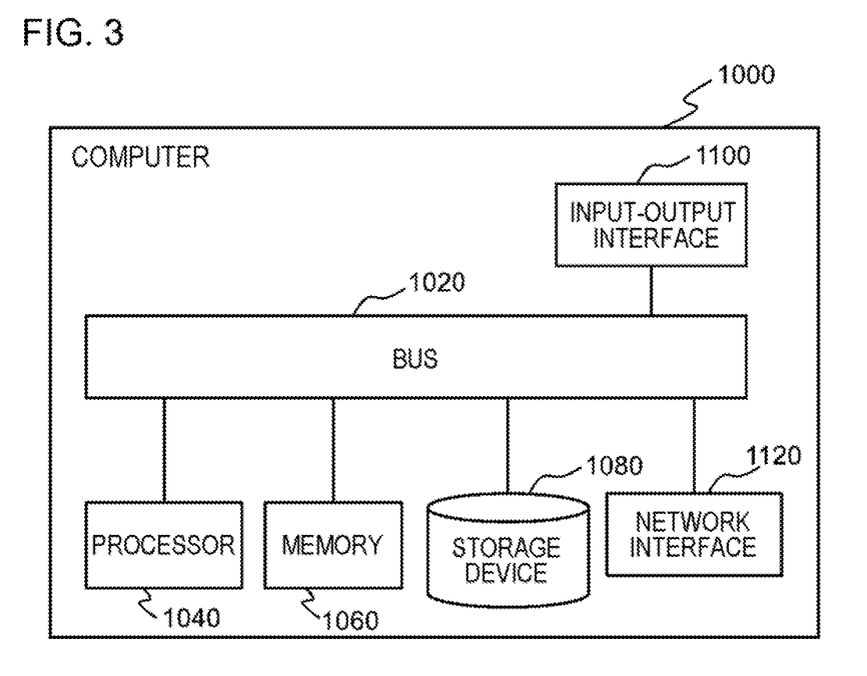
FIG. 3 is a diagram illustrating a computer for achieving the processing apparatus.

FIG. 3 is a diagram illustrating a computer 1000 for achieving the processing apparatus 10. The computer 1000 is any computer. For example, the computer 1000 is a personal computer (PC), a server machine, a tablet terminal, a smartphone, or the like. The computer 1000 may be a dedicated computer designed for achieving the processing apparatus 10, and may be a general-purpose computer. Further, the computer 1000 may be a system on chip (SoC).

The computer 1000 includes a bus 1020, a processor 1040, a memory 1060, a storage device 1080, an input-output interface 1100, and a network interface 1120. The bus 1020 is a data transmission path for allowing the processor 1040, the memory 1060, the storage device 1080, the input-output interface 1100, and the network interface 1120 to transmit and receive data with one another. However, a method of connecting the processor 1040 and the like to each other is not limited to a bus connection. The processor 1040 is various types of processors such as a central processing unit (CPU), a graphics processing unit (GPU), or a field-programmable gate array (FPGA). The memory 1060 is a main storage achieved by using a random access memory (RAM) and the like. The storage device 1080 is an auxiliary storage achieved by using a hard disk, a solid state drive (SSD), a memory card, a read only memory (ROM), or the like.

The input-output interface 1100 is an interface for connecting the computer 1000 and an input-output device. For example, an input device such as a keyboard and an output device such as a display device are connected to the input-output interface 1100.

The network interface 1120 is an interface for connecting the computer 1000 to a network. The communication network is, for example, a local area network (LAN) and a wide area network (WAN). A method of connection to the network by the network interface 1120 may be a wireless connection or a wired connection.

The storage device 1080 stores a program module that achieves each functional component unit of the processing apparatus 10. The processor 1040 achieves a function associated with each program module by reading each of the program modules to the memory 1060 and executing the program module.

Figure 4:
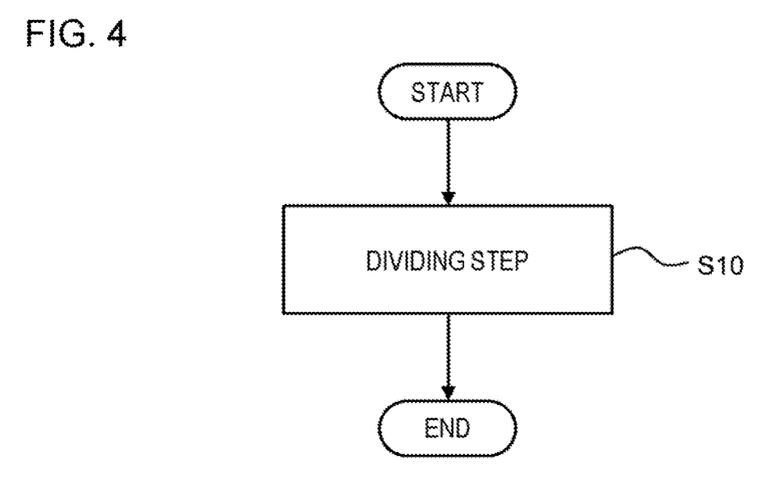
FIG. 4 is a flowchart illustrating a processing method according to the first example embodiment.

FIG. 4 is a flowchart illustrating a processing method according to the present example embodiment. In the processing method according to the present example embodiment, data are divided into a plurality of pieces of partial data, based on a content of the data (dividing step S10), and first partial data and second partial data having a degree of importance higher than that of the first partial data are held separately from each other.

The processing method according to the present example embodiment is achieved by the processing apparatus 10 as described above.

The method of dividing data by the dividing unit 110 in the dividing step S10 will be described below in detail. However, the method of dividing data by the dividing unit 110 is not limited as follows. The dividing unit 110 can determine a degree of importance of a value included in data by using outlier detection, for example.

The dividing unit 110 calculates a deviation of each value included in the data in the dividing step S10. Then, the dividing unit 110 extracts a value having the calculated deviation greater than or equal to a threshold value, and determines a set of the extracted values as the second partial data. On the other hand, the dividing unit 110 determine a set of values that are not extracted as the first partial data.

Further, the storage unit 110 may perform the dividing step S10 again on, as a target, at least one of the first partial data and the second partial data acquired by dividing the data. Herein, a threshold value different from that when initial data are divided is used. In this way, data can be divided into pieces of partial data by degree of importance of three or more stages. Information indicating a degree of importance may be associated with each piece of partial data. The information indicating a degree of importance is, for example, a numeric value indicating a level of the degree of importance. A storage location is assigned to each piece of partial data based on the information indicating a degree of importance, for example.

In the present example embodiment, the plurality of pieces of partial data generated in the dividing step S10 are each held at a security level according to a degree of importance.

Next, actions and effects of the present example embodiment will be described. The processing apparatus 10 according to the present example embodiment divides data into a plurality of pieces of partial data, based on a degree of importance, and holds each of the piece of partial data at a degree of a security according to the degree of importance. Therefore, data can be protected while suppressing a cost further than that when all pieces of data are held at a high security level.

Second Example Embodiment

A processing apparatus 10 according to a second example embodiment is the same as the processing apparatus 10 according to the first example embodiment except for a method of dividing data by a dividing unit 110.

The dividing unit 110 according to the present example embodiment performs an orthogonal transformation on data, sets a component of a frequency bandwidth higher than a predetermined reference frequency to be first partial data, and sets a component of a frequency bandwidth lower than the reference frequency to be second partial data. Details will be described below.

In sensor data and camera data, it is considered that information included in a low frequency component has a degree of importance higher than that of information included in a high frequency component such as noise. Therefore, the first partial data and the second partial data having different degrees of importance are acquired by performing an orthogonal transformation computation on data, replacing the data onto a frequency axis, and dividing the replaced data into a high frequency component and a low frequency component.

In the present example embodiment, the dividing unit 110 performs an orthogonal transformation on data received by a reception unit 100. The orthogonal transformation is, for example, a discrete cosine transform (DCT). A plurality of values included in data are replaced with a plurality of frequency components by the orthogonal transformation. Then, the dividing unit 110 sets a component of a frequency bandwidth higher than a reference frequency to be the first partial data, and sets a component of a frequency bandwidth lower than the reference frequency to be the second partial data.

The reference frequency can be predetermined according to, for example, an amount of the second partial data and a degree of a security level at which the second partial data are held. For example, as the reference frequency is set lower, the data amount of the second partial data is smaller, and a degree of importance of the second partial data is higher. Therefore, when the second partial data having a smaller data amount are held at a high security level, the reference frequency may be set lower. A balance between an operation cost and an entire security level can be flexibly set by adjusting the reference frequency.

Note that the dividing unit 110 may perform the orthogonal transformation on data, set a component within a range of a predetermined reference frequency bandwidth to be the second partial data, and set a component outside the range of the reference frequency bandwidth to be the first partial data. For example, when a frequency bandwidth including important information is previously predicted according to a use purpose of data, a reference frequency bandwidth including the frequency bandwidth is determined. In this way, a degree of importance according to a purpose can be reflected, and division of data can be performed.

Next, actions and effects of the present example embodiment will be described. In the present example embodiment, actions and effects similar to those in the first example embodiment are acquired. In addition, data can be divided without performing advanced calculation processing.

Third Example Embodiment

Figure 5:
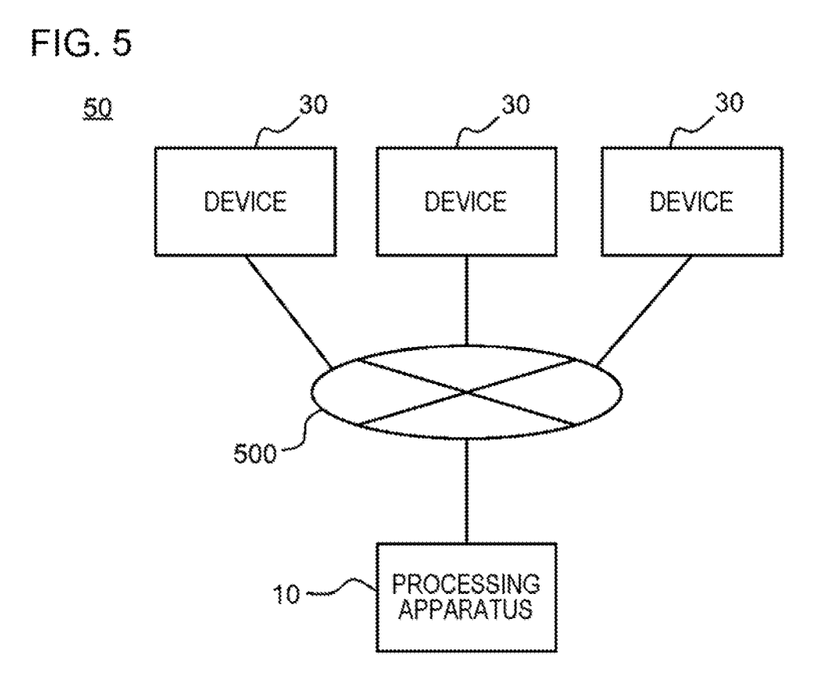
FIG. 5 is a block diagram illustrating a configuration of a system according to a third example embodiment.
Figure 6:
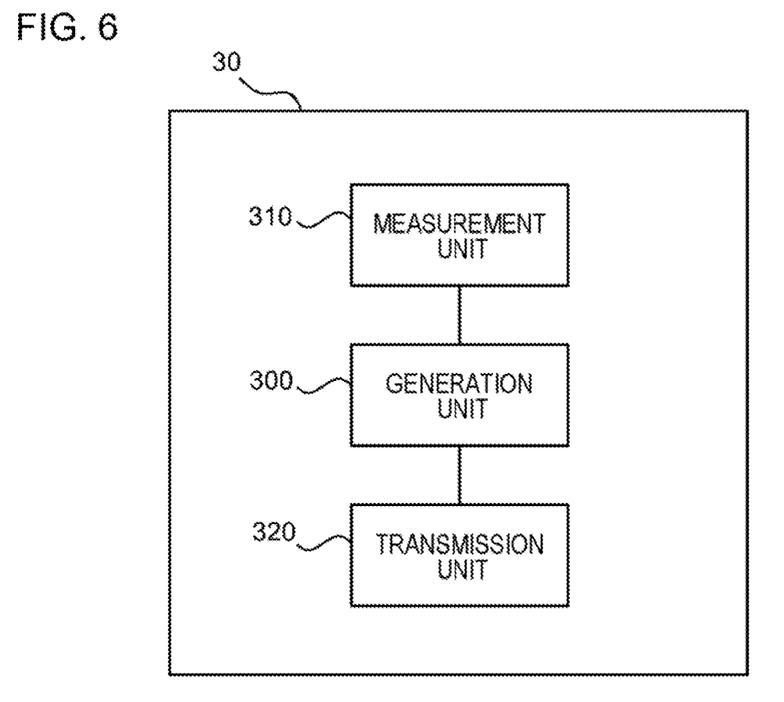
FIG. 6 is a block diagram illustrating a functional configuration of a device according to the third example embodiment.

FIG. 5 is a block diagram illustrating a configuration of a system 50 according to a third example embodiment. FIG. 6 is a block diagram illustrating a functional configuration of a device 30 according to the third example embodiment. A processing apparatus 10 according to the present example embodiment constitutes the system 50. The processing apparatus 10 according to the present example embodiment has a configuration similar to that in at least any of the first example embodiment and the second example embodiment.

The system 50 includes the device 30 and the processing apparatus 10. The device 30 includes a generation unit 300 that generates data and a transmission unit 320 for transmitting data. The processing apparatus 10 includes a reception unit 100, a dividing unit 110, and a storage unit 130. The reception unit 100 receives data. The dividing unit 110 divides the data into first partial data and second partial data having a degree of importance higher than that of the first partial data, based on a content of the data. The storage unit 130 holds at least one of the first partial data and the second partial data. Details will be described below.

In the example in FIG. 5, the system 50 includes the plurality of devices 30, and the processing apparatus 10 acquires data from each of the plurality of devices 30. Note that the plurality of devices 30 may include devices 30 of types different from each other. The system 50 according to the present example embodiment is not particularly limited, and is, for example, a system for providing an Internet of things (IoT) service. The processing apparatus 10 functions as a server in the system 50. The device 30 is, for example, an IoT device. The device 30 is mounted on, for example, a vehicle, an electric appliance, and some sort of other object. Further, the device 30 may be a terminal such as a tablet terminal or a smartphone. The processing apparatus 10 according to the present example embodiment reads at least a part of a plurality of pieces of held partial data, performs decryption and the like as necessary, and can thus use the part of partial data for providing a service or transmit the part of partial data to the outside.

In an IoT service, the number of the devices 30 being a generation source of data and a data amount acquired by the processing apparatus 10 may often become enormous, and a cost that can be spent per data amount tends to be low. On the other hand, the processing apparatus 10 according to the present example embodiment can protect data while suppressing a cost by dividing data into a plurality of pieces of partial data and holding the plurality of pieces of partial data at a security level according to a degree of importance.

The device 30 further includes a measurement unit 310 such as a sensor or a camera, for example. The generation unit 300 of the device 30 generates data by using an output signal of the measurement unit 310. The transmission unit 320 transmits the data generated by the generation unit 300. Transmission of data from the transmission unit 320 is repeatedly performed at each predetermined time, for example.

The reception unit 100 of the processing apparatus 10 receives the data transmitted from the device 30 via a communication network 500. The data received by the reception unit 100 is processed by the method described in the first example embodiment or the second example embodiment.

Note that the dividing unit 110 may determine a degree of importance of data depending on a reception interval of the data. In other words, the processing apparatus 10 may have the following configuration. That is, the reception unit 100 receives data transmitted from each of a first device 30 and a second device 30. Herein, it is assumed that a reception interval of data from the first device 30 is longer than a reception interval of data from the second device 30. Then, the dividing unit 110 determines that a degree of importance of second partial data based on the data from the first device 30 is higher than a degree of importance of second partial data based on the data from the second device 30.

Specifically, the dividing unit 110 can process as follows, for example. When the dividing unit 110 associates a numeric value indicating a level of a degree of importance with each of pieces of partial data, the dividing unit 110 corrects the level of the degree of importance by multiplying the numeric value indicating the level of the degree of importance by a coefficient determined for each device 30. Then, each of the pieces of partial data is held at a security level according to the corrected level. The coefficient is previously determined in the processing apparatus 10 depending on a reception interval of data from each of the devices 30.

It is considered that a total amount of data to be transmitted is smaller and value of each piece of data is higher in the device 30 having a long transmission interval of data than in the device 30 having a short transmission interval of data. Therefore, the dividing unit 110 can perform a determination with higher accuracy by determining a degree of importance depending on a reception interval of data.

Next, actions and effects of the present example embodiment will be described. In the present example embodiment, actions and effects similar to those in the first example embodiment are acquired.

Fourth Example Embodiment

Figure 7:
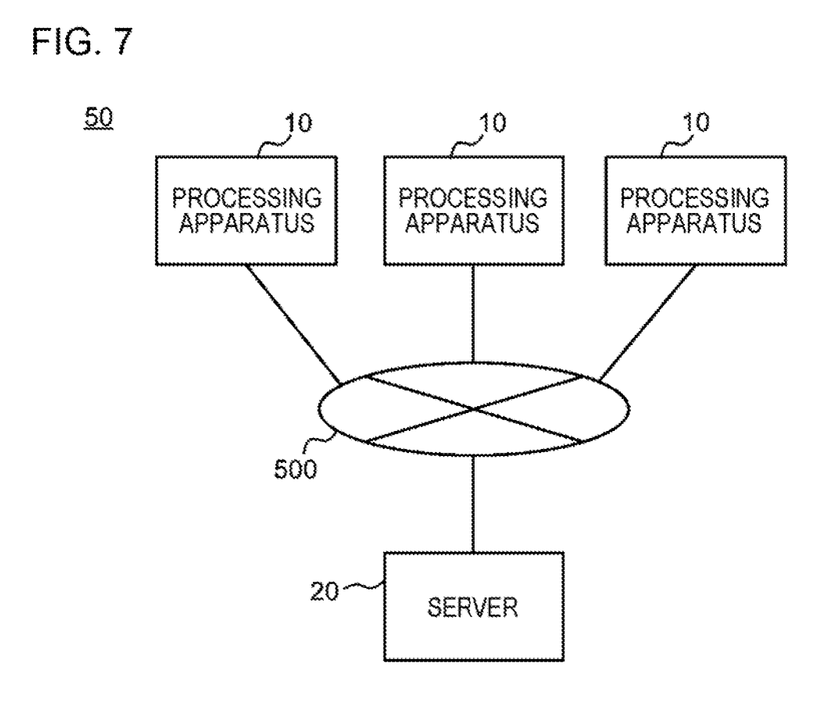
FIG. 7 is a block diagram illustrating a configuration of a system according to a fourth example embodiment.
Figure 8:
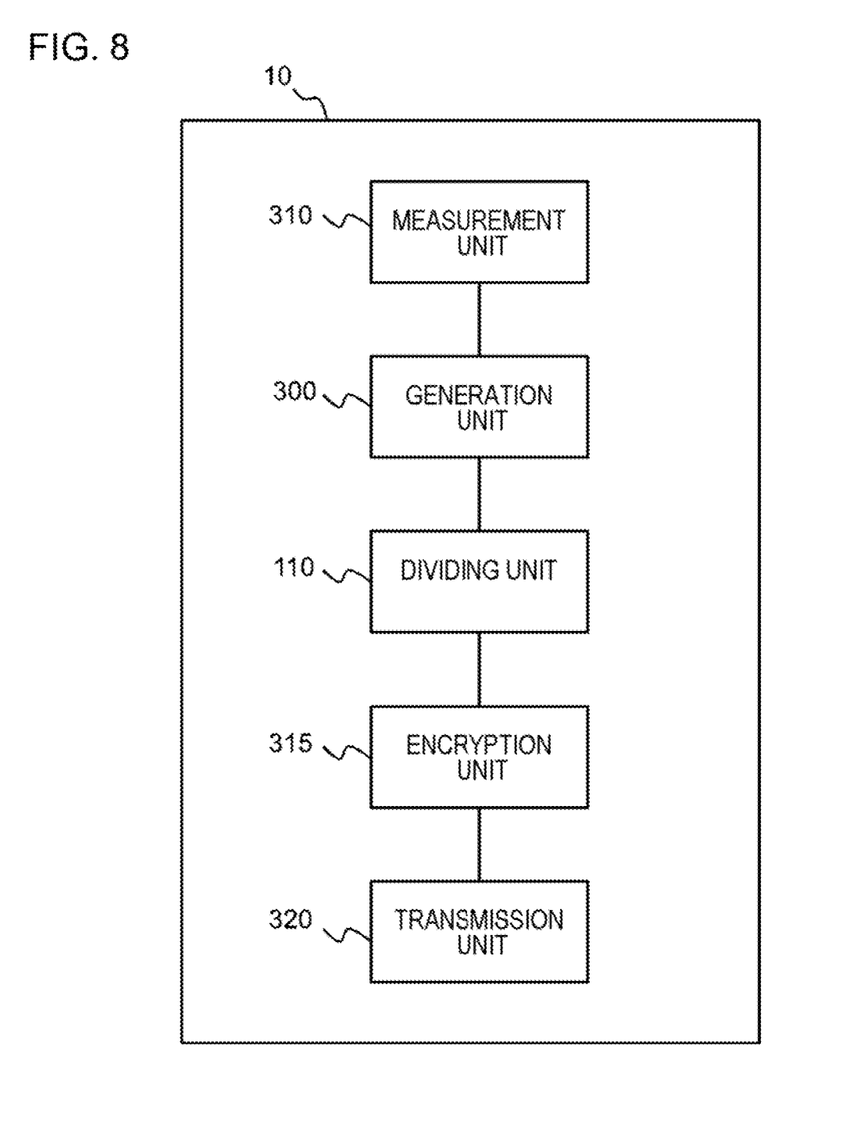
FIG. 8 is a block diagram illustrating a functional configuration of a processing apparatus according to the fourth example embodiment.
Figure 9:
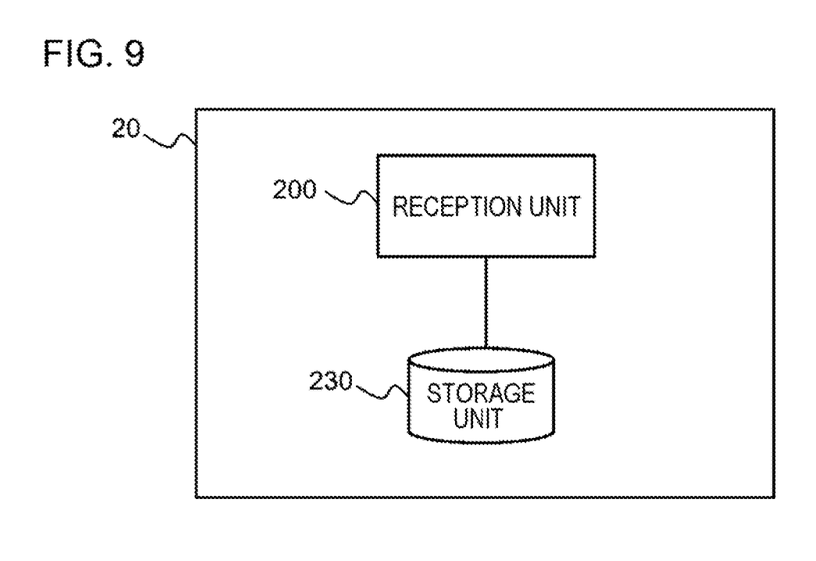
FIG. 9 is a block diagram illustrating a functional configuration of a server according to the fourth example embodiment.

FIG. 7 is a block diagram illustrating a configuration of a system 50 according to a fourth example embodiment. FIG. 8 is a block diagram illustrating a functional configuration of a processing apparatus 10 according to the fourth example embodiment. FIG. 9 is a block diagram illustrating a functional configuration of a serve 20 according to the fourth example embodiment. The processing apparatus 10 according to the present example embodiment is the same as the processing apparatus 10 according to at least any of the first example embodiment and the second example embodiment except for a point described below. Further, the system 50 according to the present example embodiment is the same as the system 50 according to the third example embodiment except for a point described below.

The system 50 according to the present example embodiment includes the server 20 and the plurality of processing apparatuses 10. In the present example embodiment, the processing apparatus 10 constitutes a device, for example. The device is, for example, an IoT device. The device is mounted on, for example, a vehicle, an electric appliance, and some sort of other object. Further, the device may be a terminal such as a tablet terminal or a smartphone. The server 20 acquires data from each of the plurality of processing apparatuses 10. The system 50 according to the present example embodiment is not particularly limited, and is, for example, a system for providing an IoT service. The server 20 according to the present example embodiment reads at least a part of one or more pieces of held partial data, performs decryption and the like as necessary, and can thus use the part of partial data for providing a service and transmit the part of partial data to the outside.

The processing apparatus 10 according to the present example embodiment includes a generation unit 300, a dividing unit 110, an encryption unit 315, and a transmission unit 320. The generation unit 300 generates data. The encryption unit 315 encrypts second partial data. The transmission unit 320 transmits the encrypted second partial data.

The processing apparatus 10 according to the present example embodiment further includes a measurement unit 310. The generation unit 300 generates data similarly to that described in the third example embodiment. Then, the dividing unit 110 performs the same processing as that in at least one of the first example embodiment and the second example embodiment on the data generated by the generation unit 300, and thereby divides the data into a plurality of pieces of partial data including first partial data and second partial data. Further, the dividing unit 110 may associate information indicating a degree of importance of each of the pieces of partial data with the partial data.

The encryption unit 315 encrypts one or more pieces of partial data according to a degree of importance of each of the pieces of partial data. In other words, the encryption unit 315 encrypts at least the second partial data among the plurality of pieces of generated partial data. Further, the encryption unit 315 may also encrypt the first partial data. Then, when partial data having a degree of importance higher than that of the second partial data are generated, the encryption unit 315 also encrypts the partial data. When the encryption unit 315 encrypts a plurality of pieces of partial data, the encryption unit 315 determines a security level at a time of encryption, based on information indicating a degree of importance associated with each of the pieces of partial data. Specifically, the encryption unit 315 sets a higher security level of encryption as partial data have a higher degree of importance.

The transmission unit 320 transmits the partial data encrypted by the encryption unit 315. Further, the transmission unit 320 transmits the partial data that are not encrypted by the encryption unit 315 as they are.

The server 20 includes a reception unit 200 and a storage unit 230. The reception unit 200 receives the second partial data transmitted from the transmission unit 320. Then, the storage unit 230 holds the second partial data received by the reception unit 200. Note that the reception unit 200 may further receive another piece of partial data in addition to the second partial data. Further, the storage unit 230 may further hold the another piece of partial data received by the reception unit 200.

Note that the server 20 may include a plurality of storage unit. In this case, a plurality of pieces of partial data received by the reception unit 200 are held in the storage unit different from each other by degree of importance.

According to the present example embodiment, each of the pieces of partial data is encrypted according to the degree of importance and then transmitted from the processing apparatus 10 to the server 20. Therefore, security in communication is excellent.

Particularly, when the dividing unit 110 performs division by the method in the second example embodiment, high calculation throughput is not needed for division, and thus a processing load does not become a problem even when the processing apparatus 10 is a device having low calculation throughput.

Note that transmission destinations of the plurality of pieces of partial data transmitted from the transmission unit 320 may be different from each other. For example, a transmission destination may be determined, based on a degree of importance of each of a plurality of pieces of transmitted partial data, in such a way that the plurality of pieces of partial data are held in storage unit having security levels different from each other.

Next, actions and effects of the present example embodiment will be described. In the present example embodiment, actions and effects similar to those in the first example embodiment are acquired. In addition, each piece of partial data is encrypted according to a degree of importance thereof and then transmitted from the processing apparatus 10 to the server 20, and thus security in communication is excellent.

While the example embodiments of the present invention have been described with reference to the drawings, the example embodiments are only exemplification of the present invention, and various configurations other than the above-described example embodiments can also be employed. For example, the plurality of steps (processing) are described in order in the sequence diagram and the flowchart used in the description described above, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiments may also be described as in supplementary notes below, which is not limited thereto.

1-1. A processing apparatus, including
a dividing unit that divides data into a plurality of pieces of partial data by degree of importance, based on a content of the data,
wherein first partial data and second partial data are held separately from each other, the second partial data having the degree of importance higher than that of the first partial data.

1-2. The processing apparatus according to supplementary note 1-1, wherein the second partial data are encrypted.

1-3. The processing apparatus according to supplementary note 1-1 or 1-2,
wherein the dividing unit divides the data in such a way that a value whose deviation with the data as a population is greater than or equal to a threshold value among values included in the data is set to be a value included in the second partial data.

1-4. The processing apparatus according to any one of supplementary notes 1-1 to 1-3,
wherein the first partial data and the second partial data are held separately from each other by being held by holding methods having security levels different from each other.

1-5. The processing apparatus according to any one of supplementary notes 1-1 to 1-4,
wherein the dividing unit performs an orthogonal transformation on the data, sets a component of a frequency bandwidth higher than a predetermined reference frequency to be the first partial data, and sets a component of a frequency bandwidth lower than the reference frequency to be the second partial data.

1-6. The processing apparatus according to any one of supplementary notes 1-1 to 1-4,
wherein the dividing unit performs an orthogonal transformation on the data, sets a component within a range of a predetermined reference frequency bandwidth to be the second partial data, and sets a component outside the range of the reference frequency bandwidth to be the first partial data.

1-7. The processing apparatus according to any one of supplementary notes 1-1 to 1-6, further including:
a reception unit that receives the data; and
a storage unit that holds at least one of the first partial data and the second partial data.

1-8. The processing apparatus according to supplementary note 1-7,
wherein the reception unit receives the data transmitted from each of a first device and a second device,
wherein a reception interval of the data from the first device to be longer than a reception interval of the data from the second device, and
wherein the dividing unit determines that the degree of importance of the second partial data based on the data from the first device is higher than the degree of importance of the second partial data based on the data from the second device.

1-9. The processing apparatus according to any one of supplementary notes 1-1 to 1-6, further including:
a generation unit that generates the data;
an encryption unit that encrypts the second partial data; and
a transmission unit transmits the encrypted second partial data.

1-10. The processing apparatus according to any one of supplementary notes 1-1 to 1-9,
wherein a first storage unit that holds the first partial data and a second storage unit that holds the second partial data are disposed away from each other.

2-1. A system including a device and a processing apparatus,
wherein the device includes:
a generation unit that generates data; and
a transmission unit that transmits the data, and
the processing apparatus includes:
a reception unit that receives the data;
a dividing unit that divides the data into first partial data and second partial data based on a content of the data, the second partial data having a degree of importance higher than that of the first partial data; and a storage unit that holds at least one of the first partial data and the second partial data.

2-2. The system according to supplementary note 2-1,
wherein the second partial data are encrypted and held in the storage unit.

2-3. The system according to supplementary note 2-1 or 2-2,
wherein the dividing unit divides the data in such a way that a value whose deviation with the data as a population is greater than or equal to a threshold value among values included in the data is set to be a value included in the second partial data.

2-4. The system according to any one of supplementary notes 2-1 to 2-3,
wherein the first partial data and the second partial data are held separately from each other by being held by holding methods having security levels different from each other.

2-5. The system according to any one of supplementary notes 2-1 to 2-4,
wherein the dividing unit performs an orthogonal transformation on the data, sets a component of a frequency bandwidth higher than a predetermined reference frequency to be the first partial data, and sets a component of a frequency bandwidth lower than the reference frequency to be the second partial data.

2-6. The system according to any one of supplementary notes 2-1 to 2-4,
wherein the dividing means performs an orthogonal transformation on the data, sets a component within a range of a predetermined reference frequency bandwidth to be the second partial data, and sets a component outside the range of the reference frequency bandwidth to be the first partial data.

2-7. The system according to any one of supplementary notes 2-1 to 2-6,
wherein the reception unit receives the data transmitted from each of first of the devices and second of the devices,
wherein a reception interval of the data from the first device to be longer than a reception interval of the data from the second device, and
wherein the dividing unit determines that the degree of importance of the second partial data based on the data from the first device is higher than the degree of importance of the second partial data based on the data from the second device.

2-8. The system according to any one of supplementary notes 2-1 to 2-7,
wherein a first storage unit that holds the first partial data and a second storage unit that holds the second partial data are disposed away from each other.

3-1. A processing method, including
dividing data into a plurality of pieces of partial data by degree of importance, based on a content of the data,
wherein first partial data and second partial data are held separately from each other, the second partial data having the degree of importance higher than that of the first partial data.

3-2. The processing method according to supplementary note 3-1,
wherein the second partial data are encrypted.

3-3. The processing method according to supplementary note 3-1 or 3-2, further including
dividing the data in such a way that a value whose deviation with the data as a population is greater than or equal to a threshold value among values included in the data is set to be a value included in the second partial data.

3-4. The processing method according to any one of supplementary notes 3-1 to 3-3, further including
holding the first partial data and the second partial data separately from each other by holding the first partial data and the second partial data by holding methods having security levels different from each other.

3-5. The processing method according to any one of supplementary notes 3-1 to 3-4, further including
performing an orthogonal transformation on the data, and dividing the data in such a way as to set a component of a frequency bandwidth higher than a predetermined reference frequency to be the first partial data, and set a component of a frequency bandwidth lower than the reference frequency to be the second partial data.

3-6. The processing method according to any one of supplementary notes 3-1 to 3-4, further including
performing an orthogonal transformation on the data, and dividing the data in such a way as to set a component within a range of a predetermined reference frequency bandwidth to be the second partial data, and set a component outside the range of the reference frequency bandwidth to be the first partial data.

3-7. The processing method according to any one of supplementary notes 3-1 to 3-6, further including:
receiving the data; and
holding at least one of the first partial data and the second partial data.

3-8. The processing method according to supplementary note 3-7, further including:
receiving the data transmitted from each of a first device and a second device, wherein a reception interval of the data from the first device to be longer than a reception interval of the data from the second device; and
determining that the degree of importance of the second partial data based on the data from the first device is higher than the degree of importance of the second partial data based on the data from the second device.

3-9. The processing method according to any one of supplementary notes 3-1 to 3-6, further including:
generating the data;
encrypting the second partial data; and
transmitting the encrypted second partial data.

3-10. The processing method according to any one of supplementary notes 3-1 to 3-9,
wherein a first storage unit holds the first partial data and a second storage unit holds the second partial data, and
the first storage unit and the second storage unit are disposed away from each other.

4-1. A computer program for achieving a processing apparatus, causing a computer to function as
a dividing unit that divides data into a plurality of pieces of partial data by degree of importance, based on a content of the data,
wherein first partial data and second partial data are held separately from each other, the second partial data having the degree of importance higher than that of the first partial data.

4-2. The computer program according to supplementary note 4-1,
wherein the second partial data are encrypted.

4-3. The computer program according to supplementary note 4-1 or 4-2,
wherein the dividing unit divides the data in such a way that a value whose deviation with the data as a population is greater than or equal to a threshold value among values included in the data is set to be a value included in the second partial data.

4-4. The computer program according to any one of supplementary notes 4-1 to 4-3,
wherein the first partial data and the second partial data are held separately from each other by being held by holding methods having security levels different from each other.

4-5. The computer program according to any one of supplementary notes 4-1 to 4-4,
wherein the dividing unit performs an orthogonal transformation on the data, sets a component of a frequency bandwidth higher than a predetermined reference frequency to be the first partial data, and sets a component of a frequency bandwidth lower than the reference frequency to be the second partial data.

4-6. The computer program according to any one of supplementary notes 4-1 to 4-4,
wherein the dividing unit performs an orthogonal transformation on the data, sets a component within a range of a predetermined reference frequency bandwidth to be the second partial data, and sets a component outside the range of the reference frequency bandwidth to be the first partial data.

4-7. The computer program according to any one of supplementary notes 4-1 to 4-6, further causing the computer to function as:
a reception unit that receives the data; and
a storage unit that holds at least one of the first partial data and the second partial data.

4-8. The computer program according to supplementary note 4-7,
wherein the reception unit receives the data transmitted from each of a first device and a second device,
wherein a reception interval of the data from the first device to be longer than a reception interval of the data from the second device, and
wherein the dividing unit determines that the degree of importance of the second partial data based on the data from the first device is higher than the degree of importance of the second partial data based on the data from the second device.

4-9. The computer program according to any one of supplementary notes 4-1 to 4-6, further causing the computer to function as:
a generation unit that generates the data;
an encryption unit that encrypts the second partial data; and
a transmission unit that transmits the encrypted second partial data.

4-10. The computer program according to any one of supplementary notes 4-1 to 4-9,
wherein a first storage unit that holds the first partial data and a second storage unit that holds the second partial data are disposed away from each other.

The invention claimed is:

1. A processing apparatus, comprising
at least one memory configured to store instructions; and
at least one processor configured to execute the instructions to perform operations comprising:
dividing data into a plurality of pieces of partial data by degree of importance, based on a content of the data,
wherein first partial data and second partial data are held separately from each other, the second partial data having the degree of importance higher than the degree of importance of the first partial data,
wherein the first partial data and the second partial data are held separately from each other by being held by holding methods having security levels different from each other;
wherein the data includes multiple pieces of numeric data, and
wherein dividing the data comprises:
calculating a deviation value for each piece of numeric data based on values of the multiple pieces of numeric data;
determining numeric data whose deviation value is greater than or equal to a threshold value as data to be included in the second partial data; and
determining numeric data whose deviation value is smaller than the threshold value as data to be included in the first partial data.

2. The processing apparatus according to claim 1, wherein the second partial data are encrypted.

3. The processing apparatus according to claim 1,
wherein the operations further comprise:
performing an orthogonal transformation on the data;
setting a component of a frequency bandwidth higher than a predetermined reference frequency to be the first partial data; and
setting a component of a frequency bandwidth lower than the reference frequency to be the second partial data.

4. The processing apparatus according to claim 1,
wherein the operations further comprise:
performing an orthogonal transformation on the data;
setting a component within a range of a predetermined reference frequency bandwidth to be the second partial data; and
setting a component outside the range of the reference frequency bandwidth to be the first partial data.

5. The processing apparatus according to claim 1, wherein the operations further comprise:
receiving the data; and
storing at least one of the first partial data and the second partial data into a storage.

6. The processing apparatus according to claim 5, wherein the operations further comprise:
receiving the data as transmitted from each of a first device and a second device; and
determines that determining the degree of importance of the data transmitted from each of the first device and the second device based on a reception interval of the data from each of the first device and the second device.

7. The processing apparatus according to claim 1, wherein the operations further comprise:
generating the data;
encrypting the second partial data; and
transmitting the encrypted second partial data.

8. The processing apparatus according to claim 1,
wherein a first storage that holds the first partial data and a second storage that holds the second partial data are disposed away from each other.

9. A system comprising a device and a processing apparatus, wherein the device includes:
at least one memory configured to store instructions; and
at least one processor configured to execute the instructions to perform operations comprising:
generating data; and
transmitting data, and the processing apparatus includes:
at least one other memory configured to store other instructions; and
at least one other processor configured to execute the other instructions to perform other operations comprising:
receiving the data;
dividing the data into first partial data and second partial data based on a content of the data, the second partial data having a degree of importance higher than a degree of importance of the first partial data,
wherein the first partial data and the second partial data are held separately from each other by being held by holding methods having security levels different from each other, and
holding at least one of the first partial data and the second partial data,
wherein the data includes multiple pieces of numeric data, and
wherein dividing the data comprises:
calculating a deviation value for each piece of numeric data based on values of the multiple pieces of numeric data;
determining numeric data whose deviation value is greater than or equal to a threshold value as data to be included in the second partial data; and
determining numeric data whose deviation value is smaller than the threshold value as data to be included in the first partial data.

10. A processing method, comprising
dividing data into a plurality of pieces of partial data by degree of importance, based on a content of the data, wherein first partial data and second partial data are held separately from each other, the second partial data having the degree of importance higher than the degree of importance of the first partial data,
wherein the first partial data and the second partial data are held separately from each other by being held by holding methods having security levels different from each other,
wherein the data includes multiple pieces of numeric data, and
wherein dividing the data comprises:
  calculating a deviation value for each piece of numeric data based on values of the multiple pieces of numeric data;
  determining numeric data whose deviation value is greater than or equal to a threshold value as data to be included in the second partial data; and
  determining numeric data whose deviation value is smaller than the threshold value as data to be included in the first partial data.

11. A non-transitory computer readable medium storing a computer program for achieving a processing apparatus, causing a computer to execute a processing method, the method comprising:
dividing data into a plurality of pieces of partial data by degree of importance, based on a content of the data,
wherein first partial data and second partial data are held separately from each other, the second partial data having the degree of importance higher than the degree of importance of the first partial data,
wherein the first partial data and the second partial data are held separately from each other by being held by holding methods having security levels different from each other,
wherein the data includes multiple pieces of numeric data, and
wherein dividing the data comprises:
  calculating a deviation value for each piece of numeric data based on values of the multiple pieces of numeric data;
  determining numeric data whose deviation value is greater than or equal to a threshold value as data to be included in the second partial data; and
  determining numeric data whose deviation value is smaller than the threshold value as data to be included in the first partial data.

* * * * *